Figure 1:
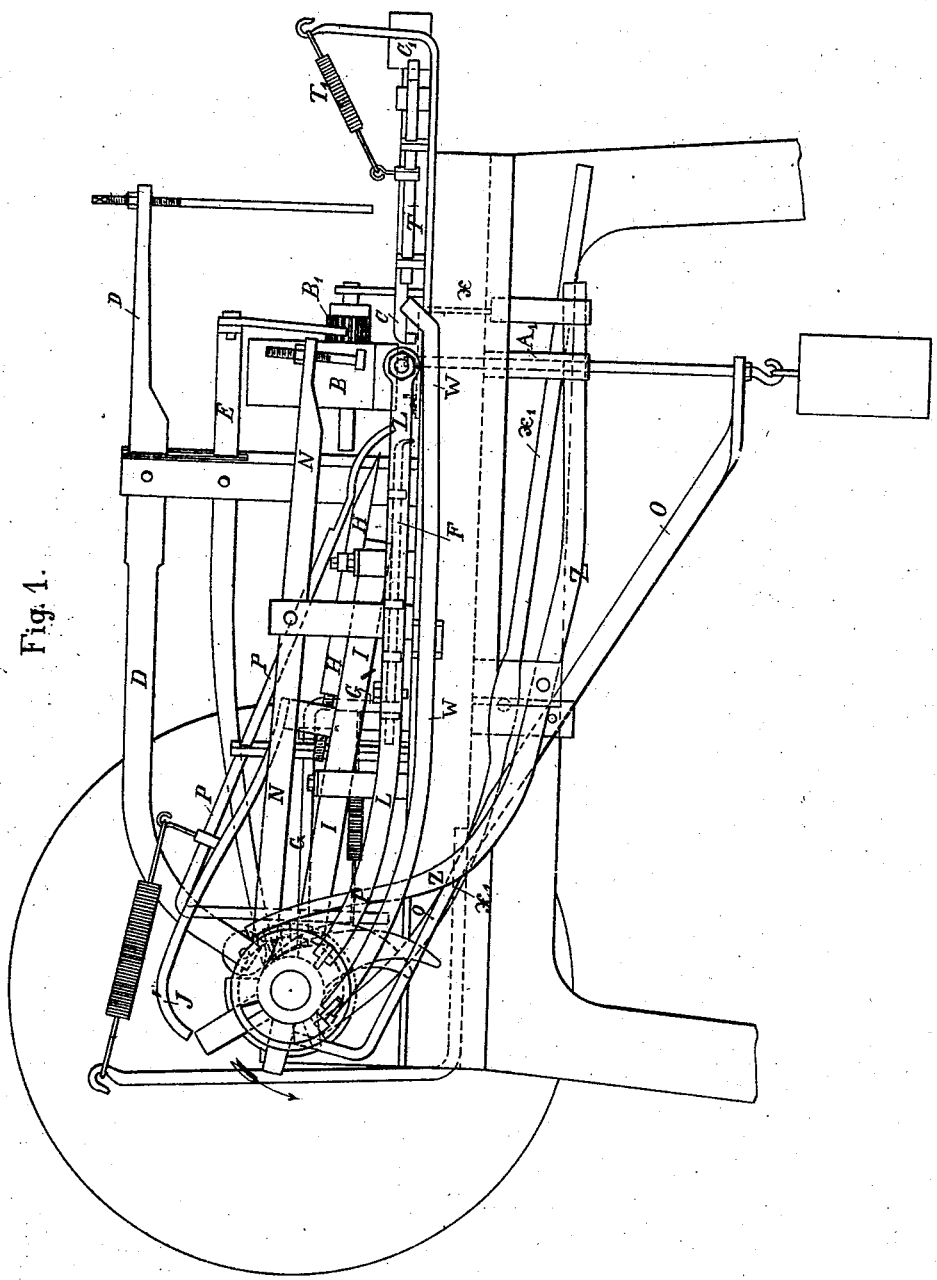

(No Model.)

C. W. HANEBECK.
MACHINE FOR MANUFACTURING FISHING HOOKS.

No. 501,906. Patented July 18, 1893.

WITNESSES:
August Nees.
Philip Kassel.

INVENTOR
Carl Wilhelm Hanebeck
BY
Hermann Bomann
ATTORNEY.

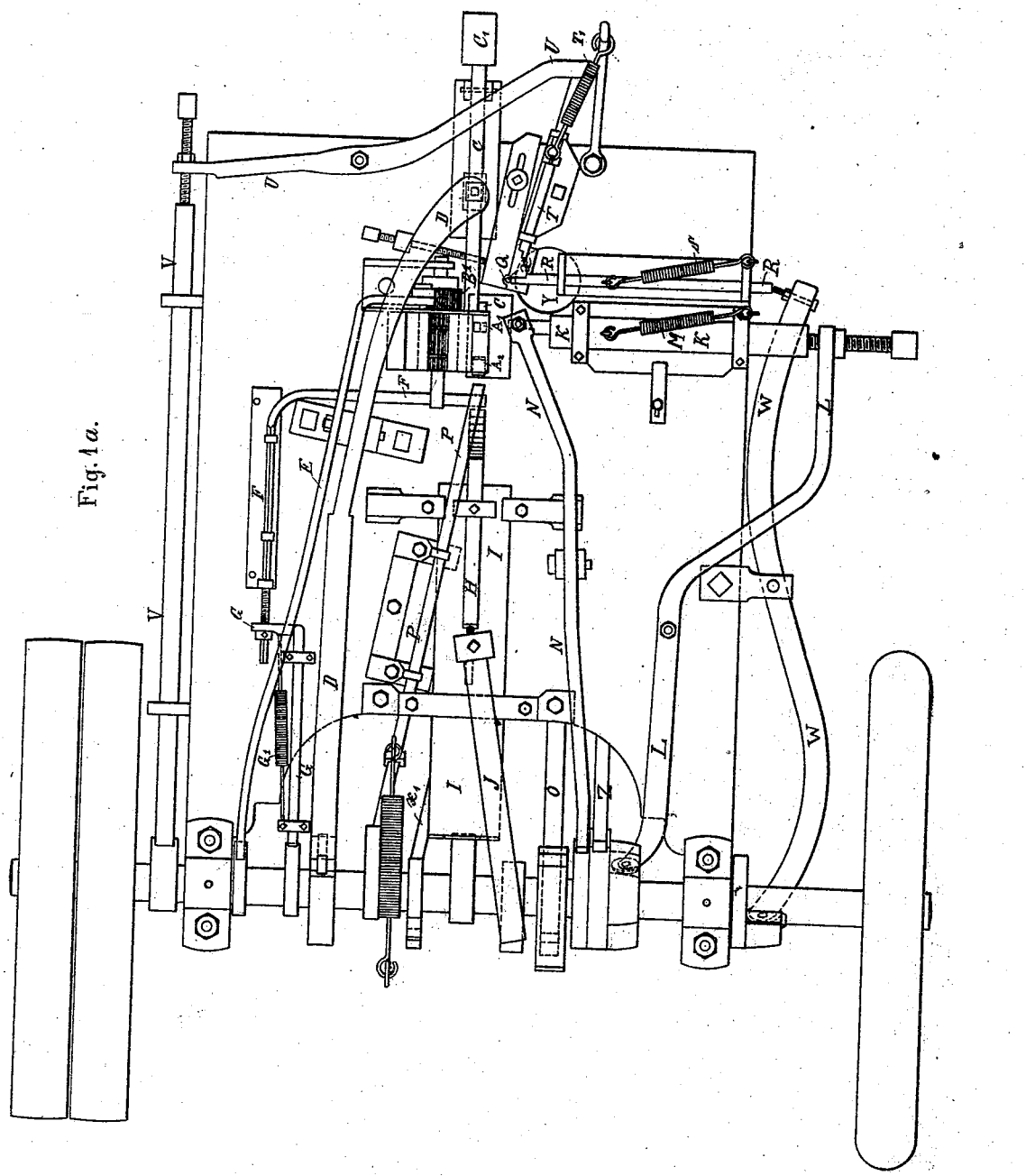

(No Model.) 4 Sheets—Sheet 3.
C. W. HANEBECK.
MACHINE FOR MANUFACTURING FISHING HOOKS.
No. 501,906. Patented July 18, 1893.
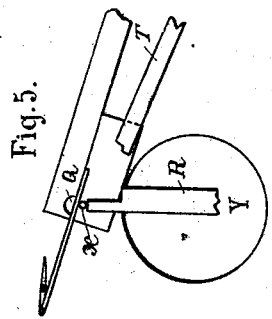
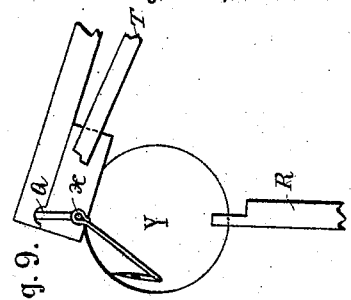
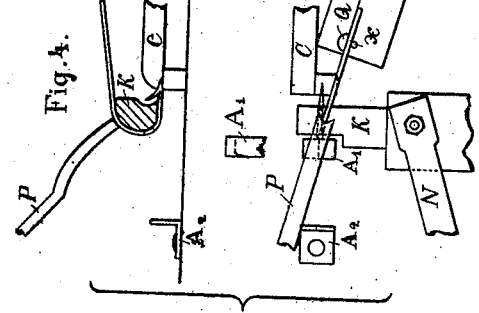
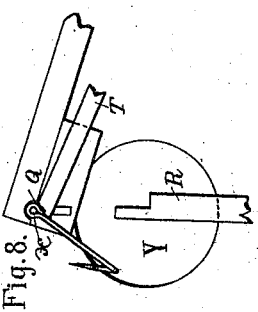
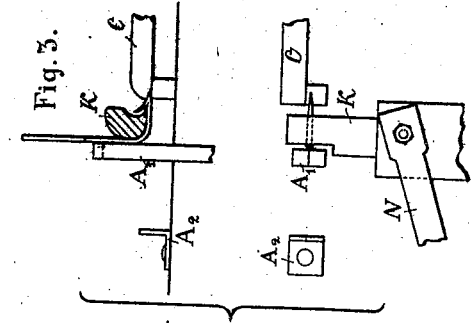
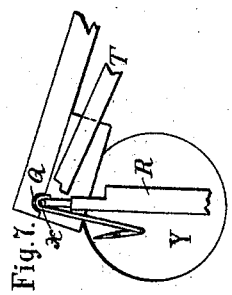
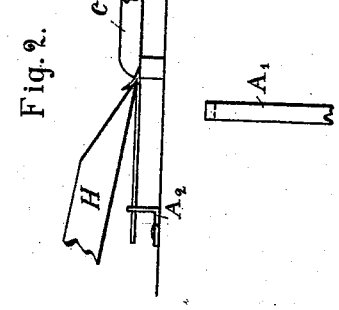
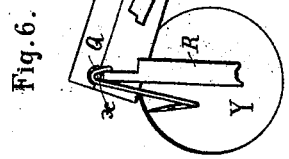
WITNESSES:
August Nees.
Philip Kassel.
INVENTOR
Carl Wilhelm Hanebeck
BY
Hermann Bormann
ATTORNEY

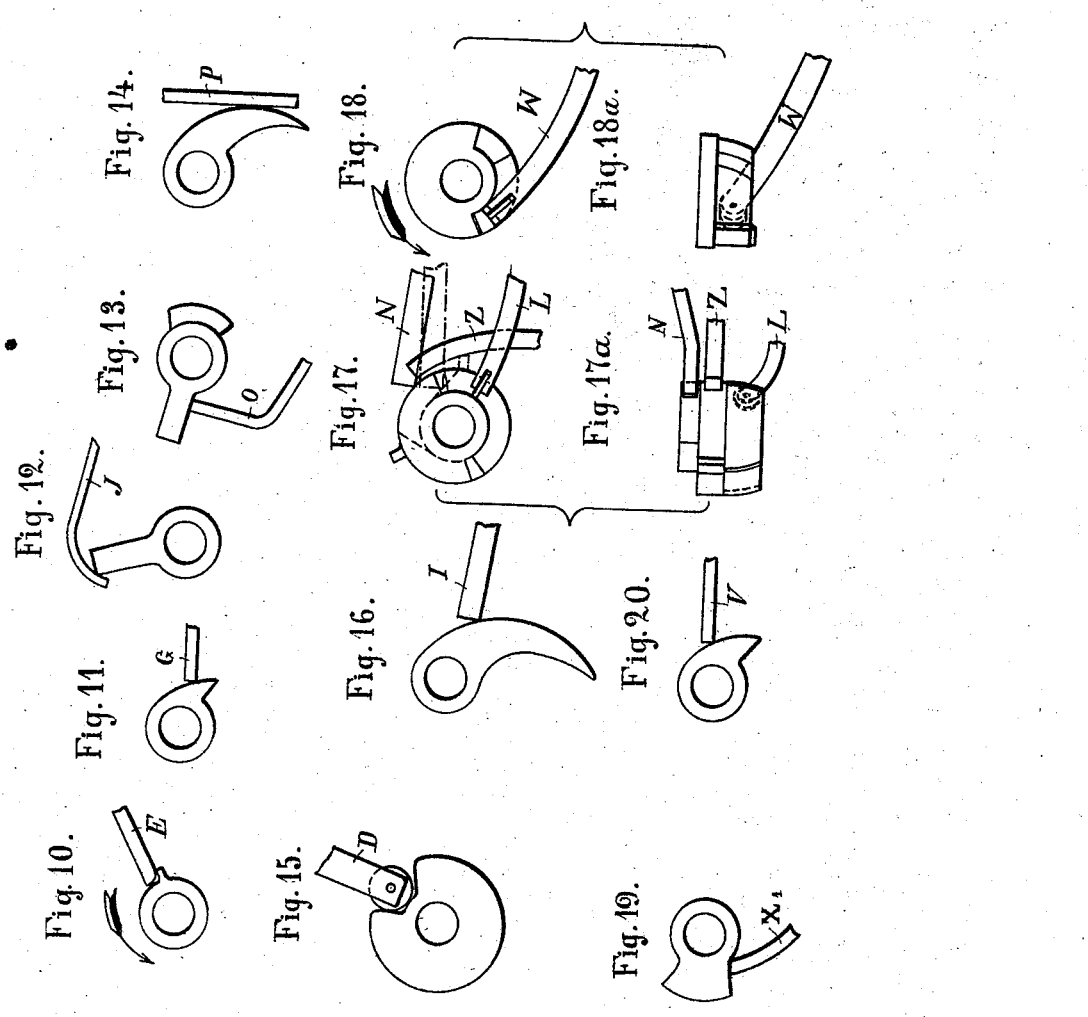

UNITED STATES PATENT OFFICE.

CARL WILHELM HANEBECK, OF ISERLOHN, GERMANY.

MACHINE FOR MANUFACTURING FISHING-HOOKS.

SPECIFICATION forming part of Letters Patent No. 501,906, dated July 18, 1893.

Application filed March 28, 1893. Serial No. 468,071. (No model.)

*To all whom it may concern:*

Be it known that I, CARL WILHELM HANEBECK, a subject of the King of Prussia, residing at Iserlohn, in the Empire of Germany, have invented certain new and useful Machines for the Manufacturing of Fishing-Hooks, of which the following is a specification.

This invention relates to a machine for the manufacturing of fish-hooks.

The new machine is illustrated in the accompanying drawings, in which—

Figure 1 is a side view and Fig. 1ª a plan of the entire machine. Figs. 2 to 9 show the various successive manipulations in completing a fish-hook. Figs. 10 to 18ª represent the various eccentrics which cause the necessary movements of the working parts.

Similar letters refer to similar parts throughout the several views.

The arrangement and construction of the machine will be best understood by describing the action of the same with reference to the drawings.

The box B (Figs. 1 and 1ª) serves as a receptacle for the wire pieces of which the hooks are to be made. These wire pieces are all of the same length and flattened at one end. The lever E by pressing on the wheel B' forwards every time one wire piece or wire pin into the slits of the forks A' and A². After this the said wire piece is moved forward by means of a lever F operated by the bar G into a slit of the lever C, so that the wire rests in the forks A² A', and in the head of the lever C. Together with the following downward movement of the fork A' effected by means of a counterweight, is moving forward a cutter H mounted on a sliding piece or sledge I. This cutter H cuts the barb of the fish-hook (as shown in Fig. 2) whereupon the cutter will be drawn back again by the action of a bar J. At this time also the parts F and G fulfill their backward stroke. A form-bar K being shaped on its surface according to the fish-hook to be made is now pushed by means of a lever L just above the wire, so as to rest directly behind the barb. The lever N locks the wire-piece in this position so that, when the fork A' is lifted by the lever O, the wire receives its first bending (see Fig. 3). After the fork A' has been drawn down by the counterweight, the bar P (see Fig. 4) folds the wire around and over the form-bar K so that the straight part or end of the wire comes to rest between the groove Q and the pin X, sliding in a suitable slot. The lever W operates the finger R, which presses the wire against the piece provided with the groove Q, so that the wire is in the position shown by Fig. 5. As soon as this operation is finished, the folding-bar P returns, the lever N ceases to press and the spring M draws back the form-bar K and the lever L. The lever D, which has so far exerted a pressure on C, rises and the head-end of the lever C lifts off a little by means of a counterweight C'. The lever W now presses the finger R, and R presses the pin X and the wire into the groove Q (Fig. 6), and the lever X', which is arranged in the lower part of the machine-frame, holds the pin X in its present position, (Fig. 7.) The spring S draws back R and W. The rod V exerts a pressure on lever U and the latter transmits the pressure to the bar T, whereby T is driven against the projecting part of the half formed eye (Figs. 7 and 8), the eye of the fish-hook thus being completed. Now the spring T' returns T, U and V to their former positions. Then the lever X' frees the pin X, and through the counterweight the latter moves a little in the direction of R. The lever Z, the greater part of which is in the lower part of the machine-frame, then draws back the pin X; the fish-hook now ready, looses its hold and falls through the opening Y into a collecting-box, (Fig. 9.) After the lever W has pressed R, and R has pressed the pin X and the wire into the groove Q, a fresh wire is fed by the feeding wheel.

All levers and mechanisms performing the various functions, are driven and operated by eccentrics and cams arranged on the main axle, which eccentrics and cams, as mentioned afore, are detailed in an enlarged scale in Figs. 10 to 18ª. The eccentrics and cams are all turning from right to left, as shown by the arrows.

What I claim as my invention, and desire to secure by Letters Patent, is—

A fish-hook manufacturing machine consisting of a feed-wheel B' for feeding the wire-pieces step-wise to fork-bearers A' A², of a sliding-lever F for pushing forward the wire-piece into a slit of a lever C, of a cutter H adapted to cut the barb when the fork A' descends, of a form-bar K around which the wire-piece is folded by means of the ascending fork A' and the bar P, and of a groove-piece Q in combination with a sliding-pin X, a finger R and a pressing-bar T adapted to form the eye of the fish-hook, and with suitable eccentrics and cams arranged on the main shaft and adapted to produce the necessary motions of the several parts substantially as and for the purpose specified.

Signed at Barmen, Germany, this 21st day of February, 1893.

CARL WILHELM HANEBECK.

Witnesses:
WILLIAM ESSENWEIN,
RUDOLPH FRICKE.